United States Patent
Lefaux et al.

(10) Patent No.: US 12,366,164 B2
(45) Date of Patent: Jul. 22, 2025

(54) METHOD FOR SIZING STUBS OPTIMIZED FOR ORBITAL WELDING OF BLADES ON A TURBOMACHINE ROTOR

(71) Applicant: SAFRAN AERO BOOSTERS, Herstal (BE)

(72) Inventors: Yann Jean-Pierre Lefaux, Herstal (BE); Damien Verhelst, Herstal (BE)

(73) Assignee: SAFRAN AERO BOOSTERS, Herstal (BE)

( * ) Notice: Subject to any disclaimer, the term of this patent is extended or adjusted under 35 U.S.C. 154(b) by 0 days.

(21) Appl. No.: 18/736,903

(22) Filed: Jun. 7, 2024

(65) Prior Publication Data

US 2024/0352858 A1     Oct. 24, 2024

Related U.S. Application Data

(63) Continuation of application No. 18/640,177, filed on Apr. 19, 2024.

(30) Foreign Application Priority Data

Apr. 21, 2023    (BE) .................................. 2023/5297

(51) Int. Cl.
| | |
|---|---|
| *F01D 5/30* | (2006.01) |
| *B23K 20/12* | (2006.01) |
| *F01D 5/02* | (2006.01) |
| *B23K 101/00* | (2006.01) |

(52) U.S. Cl.
CPC .............. *F01D 5/02* (2013.01); *B23K 20/129* (2013.01); *B23K 2101/001* (2018.08); *F01D 5/3061* (2013.01); *F05D 2230/239* (2013.01)

(58) Field of Classification Search
CPC ....... F01D 5/3061; F01D 5/02; B23K 20/129; F05D 2230/239
See application file for complete search history.

(56) References Cited

U.S. PATENT DOCUMENTS

| | | | | |
|---|---|---|---|---|
| 6,095,402 A | * | 8/2000 | Brownell | B23K 20/129 228/119 |
| 6,106,233 A | * | 8/2000 | Walker | B23K 20/129 416/213 R |
| 6,160,237 A | * | 12/2000 | Schneefeld | B23K 20/1205 219/601 |
| 9,194,245 B2 | * | 11/2015 | Wlasowski | B23K 20/12 |

FOREIGN PATENT DOCUMENTS

| | | |
|---|---|---|
| EP | 1495829 | 1/2005 |
| EP | 2535516 | 12/2012 |

* cited by examiner

*Primary Examiner* — Michael L Sehn
(74) *Attorney, Agent, or Firm* — RANKIN, HILL & CLARK LLP

(57) ABSTRACT

A method for sizing a section of a junction by orbital friction welding with an eccentric e, between a blade and a stub of a bladed disk for a turbomachine. The sized section has a rounded contour at one or two ends of said section along a chord of the blades, each corresponding to a leading edge or a trailing edge of said blades, said rounded contour(s) having over a sector of at least 120° an average radius of at least twice the eccentric e.

11 Claims, 5 Drawing Sheets

METHOD FOR SIZING STUBS OPTIMIZED FOR ORBITAL WELDING OF BLADES ON A TURBOMACHINE ROTOR

This application is a continuation of patent application Ser. No. 18/640,177, filed Apr. 19, 2024, which claims priority to BE 2023/5297, filed on Apr. 21, 2023, the contents of these applications are hereby incorporated by reference in their entirety.

TECHNICAL AREA

The invention relates to a method of manufacturing a bladed disk for a turbomachine, and more particularly to a method of manufacturing a bladed disk by orbital friction welding of blades to a rotor disk of a turbomachine. The invention also relates to a method of forming stubs as well as a blade and a rotor disk comprising a stub formed by said method.

Prior Art

Climate change is a major concern for many legislative and regulatory bodies around the world. Indeed, various restrictions on carbon emissions have been, are or will be adopted by various states. In particular, an ambitious standard applies both to new types of aircraft but also to those in circulation requiring the implementation of technological solutions in order to make them comply with current regulations. Civil aviation has been mobilizing for several years now to make a contribution to the fight against climate change.

Technological research efforts have already made it possible to very significantly improve the environmental performance of aircraft. The Applicant takes into consideration the impacting factors in all phases of design and development to obtain aeronautical components and products that consume less energy, are more respectful of the environment and whose integration and use in civil aviation have moderate environmental consequences with the aim of improving the energy efficiency of aircraft.

Consequently, the Applicant is constantly working to reduce its negative climate impact through the use of methods and the exploitation of virtuous development and manufacturing processes and minimizing greenhouse gas emissions to the minimum possible for to reduce the environmental footprint of its activity.

This sustained research and development work concerns new generations of aircraft engines, the reduction of aircraft weight, particularly through the materials used and lightweight on-board equipment, and the development of the use of electrical technologies to ensure propulsion, and, essential complements to technological progress, aeronautical biofuels.

To this end, the invention is the result of technological research aimed at very significantly improving the performance of aircraft and, in this sense, contributes to reducing the environmental impact of aircraft.

In this context, the invention relates to an orbital friction welding process for producing a bladed disk (commonly referred to as: "blisk") or a bladed drum (commonly referred to as "blum") of a turbomachine compressor.

Orbital friction welding is a welding process in which the parts to be assembled are brought into contact under force and welded by a circular movement generally defined by an eccentric, and accompanied by a uniform tangential speed, so as to generate a friction and homogeneous heating at the level of a weld junction between the two parts.

It is also known to use linear friction welding. This is a welding process in which the necessary heat is created by a back and forth movement of the interfaces to be welded. However, orbital friction welding has several advantages over linear friction, for example, the relative movement between the two interfaces is continuous thanks to the circular friction movement, which provides better thermal homogeneity. Unlike linear movement for which the relative speed of the two parts becomes zero at each half-period of oscillation. Additionally, the cycle time of orbital welding is considerably lower than that of linear friction welding (respectively about 2 minutes compared to about 5 minutes).

The published patent document EP 2 535 516 A1 discloses a process for orbital friction welding of blades to a turbomachine rotor in which, once a material consumption is reached in a welding zone between the blade and the disk, the orbital movement is stopped at a reference position, and a forging force is exerted on the blade against the rotor in order to finalize the weld.

After welding, progressive machining adapting to the external surface of the blade is then carried out in order to remove the material from the interface which will have been pushed outwards during welding (commonly referred to as: "flash"), so as to avoid any jump linked to machining.

However, welding may reveal a weld junction of the blade with the rotor disk which may present structural defects and/or material health defects.

The published patent document EP 1 495 829 A1 discloses a process for manufacturing combined profiled blades and discs, in which each of the blades has a stub to be welded to the disc by linear friction.

The document proposes a design of the stub comprising respectively at the ends of the front edge and rear edge zone, an excess of material ending in a straight edge extending parallel to a direction of oscillation of the linear friction welding.

However, the stub design proposed by the paper has room for improvement, as it cannot be applied to orbital welding. Indeed, such a stub does not make it possible to obtain a welded junction by orbital welding which is healthy and free of contaminants.

SUMMARY OF THE INVENTION

Technical Problem

The invention aims to solve at least one of the problems posed by the prior art. More precisely, the invention aims to propose a junction section of a blade and a disc stub making it possible to control and optimize orbital welding in order to obtain a healthy welded junction free of contaminants.

Technical Solution

The subject of the present invention is a method for sizing a section of a junction by orbital friction welding with an eccentric e, between a blade and a stub of a bladed disk for a turbomachine, wherein the sized section has a rounded contour at one or two ends of said section along a chord of the blades, each corresponding to a leading edge or a trailing edge of said blades, said rounded contour(s) having over a sector of at least 120° an average radius of at least twice the eccentric e.

According to an advantageous embodiment of the invention, the or each of the rounded contours is at a distance from the leading edge or the corresponding trailing edge, so as to form an upstream or downstream extra thickness, respectively, relative to a final section of the blades, said or each of said upstream or downstream extra thicknesses being intended to be removed after joining by welding.

According to an advantageous embodiment of the invention, the or each of the upstream or downstream extra thickness has a value along the chord of the blades greater than 1 mm and/or less than 15 mm.

According to an advantageous embodiment of the invention, the sized section forms an extra thickness intrados and/or extrados relative to a final section of the blades, said or each of said extra thicknesses intrados or extrados being intended to be removed after joining by welding.

According to an advantageous embodiment of the invention, the or each of the intrados or extrados extra thickness has a value along a perpendicular to the chord of the blades greater than 0.5 mm and/or less than 5 mm.

The invention also relates to a method of manufacturing a bladed turbomachine disk comprising the following steps: providing a disk with stubs; joining of blades to the stubs by orbital friction welding, wherein the stubs of the disc are sized according to the sizing method according to the invention.

According to an advantageous embodiment of the invention, said manufacturing process comprising the additional step: machining of the stubs and the blades joined to the stubs so as to remove the enlargement and arrive at the final section of the blades.

The invention also relates to a rotor disk intended for the manufacture of a bladed disk for a turbomachine, the rotor disk comprising an external surface provided with an annular row of stubs extending radially from said external surface, each of the stubs comprising a section intended to be welded by orbital friction with a blade, wherein said stubs are sized by the method according to the invention.

According to an advantageous embodiment of the invention, the section is between 200 mm² and 7000 mm².

According to an advantageous embodiment of the invention, the section is between 2000 mm² and 3000 mm².

The invention also relates to a blade intended for the manufacture of a bladed disk for a turbomachine, the blade comprising a face intended to be welded by orbital friction with a rotor disk, wherein said face has a section sized by the sizing method according to the invention.

According to an advantageous embodiment of the invention, the section is between 200 mm² and 7000 mm².

According to an advantageous embodiment of the invention, the section is between 2000 mm² and 3000 mm².

The measures of the invention are advantageous in that the sizing of the junction section by optimizing the rounded contours at the ends, in particular following the determination of the corresponding average radius, allows optimal widening of said ends relative to the final section, so as to guarantee sufficient surface in contact during welding in order to ensure better homogeneity of the mixing of the material, resulting in a resistant and more robust weld.

In addition, the stub dimensioned by the method of the invention includes improved stiffness.

It is understood that each detail of an embodiment below can be combined with each other detail of the other embodiments.

DETAILED DESCRIPTION OF THE EMBODIMENTS

In the description which follows, the terms "internal" and "external" refer to positioning relative to the axis of rotation of an axial turbomachine. The axial direction corresponds to the direction along the axis of rotation of the turbomachine, the lengths being measured axially. Widths are measured according to circumference. The radial direction is perpendicular to the axis of rotation. Upstream and downstream refer to the main flow direction of the flow in the turbomachine.

The dimensions of the figures are not to scale and in particular the thicknesses or the radial dimensions are exaggerated to facilitate the reading of the figures.

Figure 1:
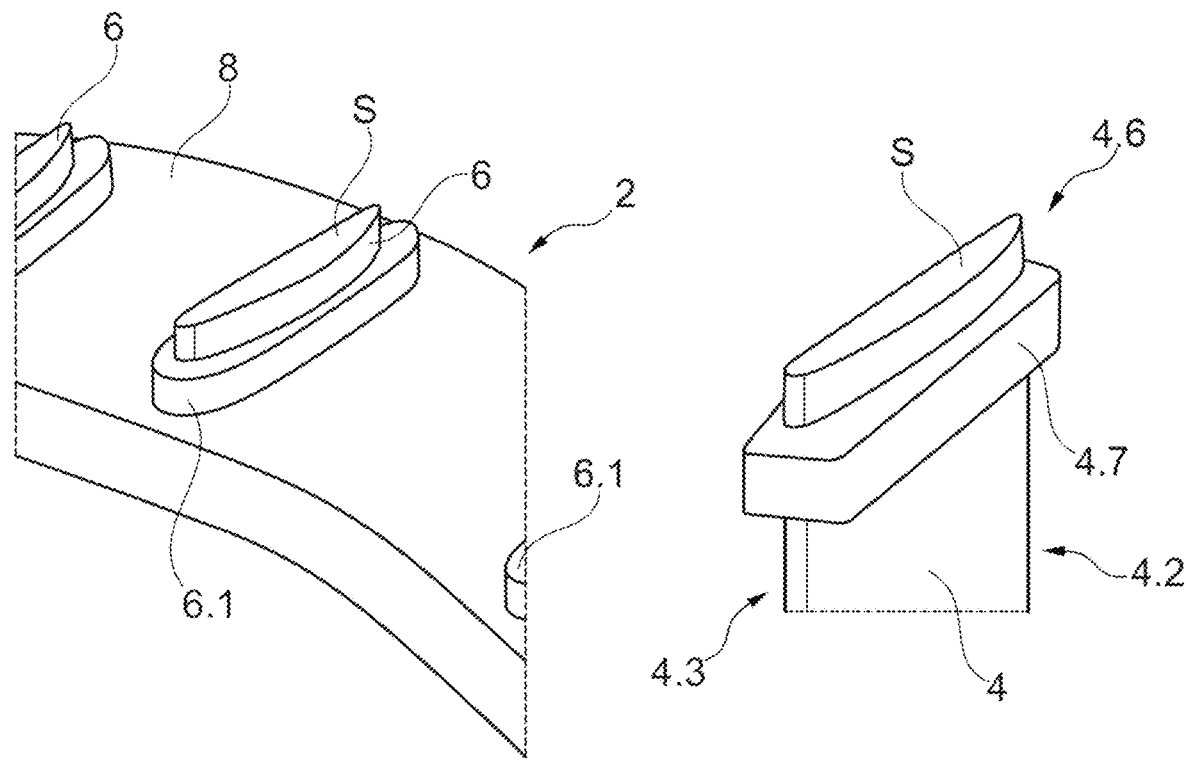
FIG. 1 illustrates a rotor disk comprising a stub extending radially from an external surface of said disk, and a blade comprising a face having a junction section intended to be welded by orbital friction to the stub of the disk.

FIG. 1 illustrates a rotor disk 2 comprising a stub 6 extending radially from an external surface 8 of said disk 2, and a blade 4 comprising a junction section S intended to be welded by orbital friction to the stub 6 of the disc 2, and precisely welded to an identical junction section S of said stub 6. The two junction sections S are flat. Orbital friction welding will be explained later in this description.

The rotor disk 2 comprises an annular row of stubs 6 intended to be welded with corresponding blades 4, so as to form a bladed turbomachine disk. Each blade 4 comprises a lower end 4.6 having a shape substantially similar to the stub 6 of the disc 2. It is considered that the blade 4 comprises a stub at its lower end 4.6.

Preferably, the bladed disk is a mobile wheel intended to be placed upstream of an air flow separation nozzle in the turbomachine. For this purpose, the external surface 8 corresponds to an air guiding surface of a stream of fluid along and through a rotor. Alternatively, the blisk may correspond to a drum-type rotor belonging to a high-pressure or low-pressure compressor.

Preferably, the bladed disk is a so-called "bi-material" disk comprising two different titanium alloys. For example, the blades 4 can be manufactured from a Ta6v alloy, and the rotor disk 2 from one of the following alloys: Ti17, Ti575, Ti1023.

Advantageously, the mixture of the two different titanium alloys (Ta6v and Ti17) presents easier machinability, and makes it possible to achieve a gain in mass compared to a solution based, for example, solely on a Ti17 alloy, this is notably due to a density of Ta6v which is slightly lower than that of Ti17.

Indeed, the Ti17 alloy was preferentially chosen for the disc part for its good fatigue characteristics HCF (English acronym for: "High Cycle Fatigue") and LFC ("Low Cycle Fatigue"). A Ti17 disc will also show a greater margin in burst speed than a Ta6v disc. For the blades, the Ta6v alloy was chosen because it provides the blades with a higher elongation at break (better impact resistance), and better crack propagation behavior which results in better durability to low energy impacts.

In the configuration illustrated in FIG. 1, the blade 4 is illustrated in a radial direction opposite to that during welding in order to better visualize the junction section S at the foot of said blade 4.

Preferably, the stub 6 also has the junction section S which is identical to that of the blade 4. Advantageously, the section S is dimensioned according to a stub sizing process which will be explained according to FIGS. 2 to 4.

Figure 2:
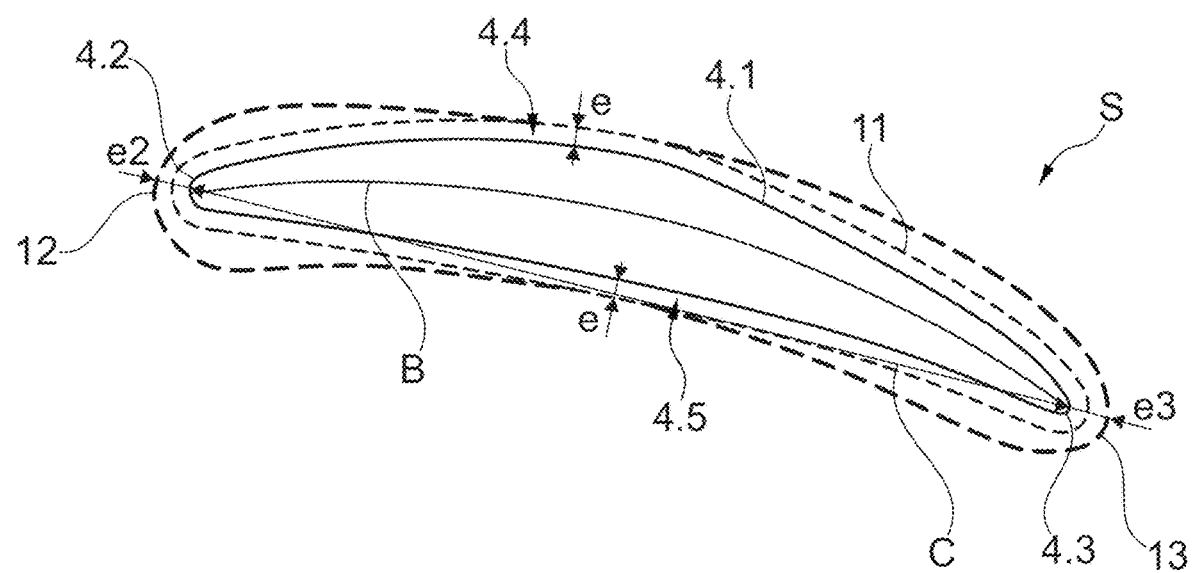
FIG. 2 schematically illustrates the dimensioning of the junction section of the blade and/or the stub.

FIG. 2 schematically illustrates the dimensioning of the junction section S of the blade and/or the stub.

The dimensioning of the junction section S is carried out following the stub dimensioning method which preferably comprises a first step of modeling a first section 11 from an aerodynamic profile 4.1 of the blade, said profile 4.1 corresponds to the profile final blade after machining.

Preferably, the first section 11 comprises a widening of the profile 4.1 by means of an extra thickness e corresponding, preferably, to an eccentric e of the orbital oscillation movement during orbital friction welding. The eccentric e corresponds to the offset value of the tool (maintaining the blade) and the disk relative to a reference center, making it possible to create the orbital oscillation movement. In other words, the eccentric corresponds to the distance between the axis of rotation of the tool and the central point around which it performs its orbital movement.

Preferably, the first section 11 comprises a widening of the profile 4.1 by means of an extra thickness e corresponding, preferably, to an eccentric e of the orbital oscillation movement during orbital friction welding. The eccentric e corresponds to the offset value of the tool (maintaining the blade) and the disk relative to a reference center, making it possible to create the orbital oscillation movement. In other words, the eccentric corresponds to the distance between the axis of rotation of the tool and the central point around which it performs its orbital movement.

The widening with the extra thickness e is preferably constant and follows the shape of profile 4.1. However, the extra thickness e may present variations around said profile 4.1.

The method then comprises modeling the junction section S from an enlargement of the first section 11 so as to form an upstream rounded contour 12 and a downstream rounded contour 13, corresponding respectively, to the ends 12 and 13 of the section S at each of the leading edge 4.2 and trailing edge 4.3 of the profile 4.1 of the blade.

In this configuration, each of the upstream rounding 12 and downstream rounding 13 is distant, respectively, from the leading edge 4.2 by an upstream extra thickness e2, and distant from the downstream edge 4.3 by a downstream extra thickness e3, along the chord C of the profile 4.1 of dawn.

Preferably, the upstream thicknesses e2 and downstream e3 conform to the extra thickness e at the level of an extrados 4.4 and an intrados 4.5 of the profile 4.1 of the blade. The upstream thicknesses e2 and downstream e3 are preferably greater than the extra thickness e.

For this purpose, the junction section S corresponds to the enlarged aerodynamic section of the blade, with a greater widening at the level of the leading edges 4.2 and trailing edges 4.3.

It should be noted that prior to orbital friction welding, a volume of sacrificial material (extending essentially radially) is provided on each of the blades and the stubs to be assembled. This sacrificial volume is caused to be extruded outside the contact interface between the two junction sections S, thus forming a burr, called: "flash", which will then be eliminated, preferably, by machining, in order to arrive to the final section (corresponding to aerodynamic profile 4.1 of the blade) to form the bladed disc.

However, in the case where state-of-the-art stubs comprise non-dimensioned sections according to the method of the invention, the flash risks causing a recirculation of material inside the regions of said most sections. narrow, typically at the leading edge and the trailing edge, and risks creating recesses and/or not evacuating contaminants created in the first moments of the weld.

Advantageously, the dimensioning of the junction section S following an enlargement compared to the final section 4.1, makes it possible to enlarge the contact surface during orbital friction welding so as to avoid ensuring thermal homogeneity during the weld, precisely in the final section 4.1 of the blade 4. Indeed, if we add an extra thickness e at least equal to the value of the eccentric, this means that the points of the final aerodynamic surface 4.1 are always in contact during welding (between the two stubs). Unlike the points in this extra thickness e which, by the orbital movement, are only in contact with the opposite surface during part of the orbit.

Thus, during welding, a material consumption rate remains constant at the right of section 11, which makes it possible to avoid the recirculation of the material (potentially harmful because it prevents the evacuation of impurities) at the level of the section of the final aerodynamic profile 4.1 of the blade and thus allow homogeneity and continuity of the mixing of the material of the stub with that of the blade making it possible to further preserve the aerodynamic profile of the blade and to obtain a strong junction.

Each of the rounded contours 12 and 13 has an average radius allowing the modeling of the section S. In fact, the average radii of the roundings are advantageously predetermined so as to obtain extra thicknesses at the ends of the section S which make it possible to ensure optimal welding from dawn to stub.

Figure 3:
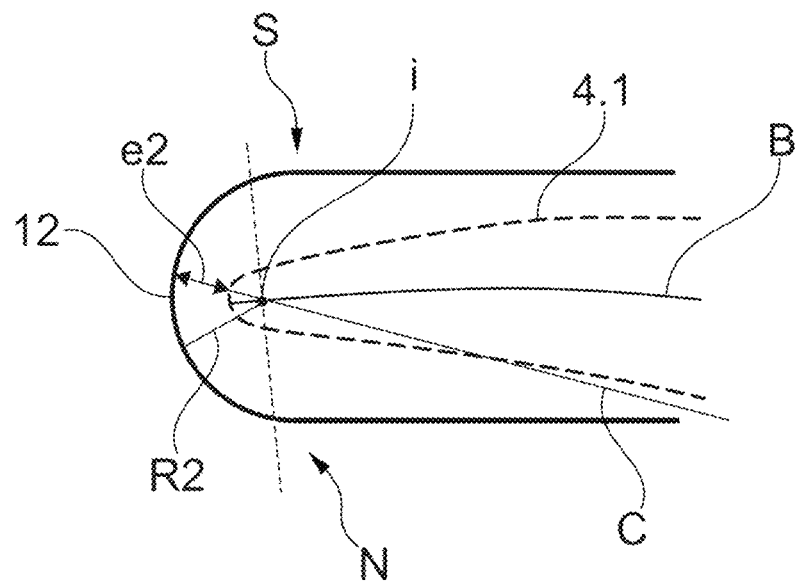
FIG. 3 illustrates an enlarged view of a rounded contour upstream at one end of the junction section of FIG. 2.

FIG. 3 illustrates an enlarged view of the upstream rounded contour 12 of the dimensioned junction section S.

It can be seen that the upstream rounded contour 12 has an average radius R2 in a sector N of at least 120° from a center i of said contour 12. The sector N preferably extends over 180°, for this purpose, said sector N is perpendicular to a camber line B of profile 4.1 of the blade.

Sector N can extend up to 220°, camber line B crosses a substantially central part of said sector N.

The center i of the upstream rounded contour 12 can be coincident with the center of a rounding to the right of the leading edge 4.2, or offset from said center.

The average radius R2 corresponds to an average of radii extending over sector N and can vary by at most ±10% compared to the value of the average radius R2.

Advantageously, the value of the average radius R2 corresponds to at least twice the value of the eccentric e, or to at least four times the value of said eccentric e, and to at most six times the value of said eccentric e.

Preferably, the value of the eccentric e is greater than 0.25 mm and/or less than 4 mm, and more preferably between 0.5 mm and 2.5 mm.

The upstream extra thickness e2 has a value along the chord C which depends on the average radius R2 determined in sector N. For this purpose, the value of the upstream extra thickness e2 is greater than 0.5 mm and/or less than 25 mm, and more preferably between 1 mm and 15 mm.

Outside of sector N, the upstream extra thickness e2 decreases so as to conform with the extra thickness e to the right of the extrados 4.4 and the intrados 4.5 visible in FIG. 2.

Figure 4:
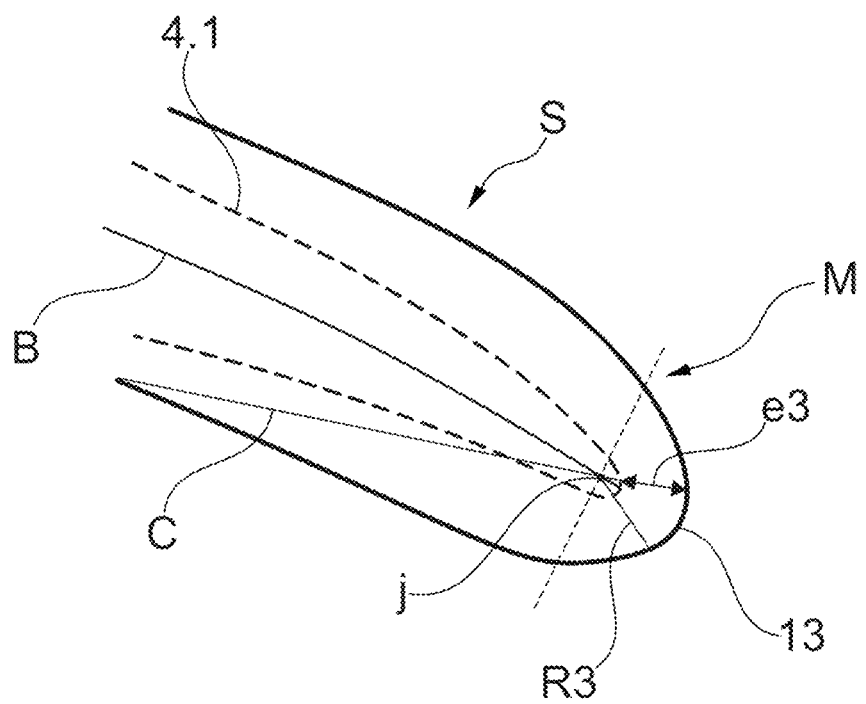
FIG. 4 illustrates an enlarged view of a downstream rounded contour at one end of the junction section of FIG. 2.

FIG. 4 illustrates an enlarged view of the downstream rounded contour 13 of the dimensioned junction section S.

With reference to FIGS. 3 and 4, the downstream rounded contour 13 has an average radius R3 in a sector M of at least 120° from a center j of said contour 13. The sector M preferably extends over 180°, and is perpendicular at the camber line B and extends similarly to the sector N having the average radius R2.

The center j of the upstream rounded contour 13 can be coincident with the center of a rounding to the right of the trailing edge 4.3, or offset from said center.

The average radius R3 corresponds to an average of radii extending over sector M and can vary by at most ±10% compared to the value of the average radius R3.

Advantageously, the value of the average radius R3 corresponds to at least twice the value of the eccentric e, or to at least four times the value of said eccentric e, and to at most six times the value of said eccentric e.

For this purpose, the value of the downstream extra thickness e3 along the chord C is greater than 0.5 mm and/or less than 25 mm, and more preferably between 1 mm and 15 mm.

Outside of sector M, the downstream extra thickness e3 decreases so as to conform with the extra thickness e to the right of the extrados 4.4 and the intrados 4.5 visible in FIG. 2.

The value of the average radius R3 of the downstream rounded contour 13 can approximately correspond to the value of the average radius R2 of the upstream rounded contour 12 (the term approximately here means ±20% of the nominal value).

The modeling of the junction section S can be carried out manually using modeling software, or automated by a specific computer algorithm.

Advantageously, the widening of the ends 12 and 13 by means of the upstream e2 and downstream e3 extra thicknesses makes it possible to optimally dimension the junction section S. In fact, the average radii R2 and R3 which are greater than at least twice the eccentric used during orbital welding and to widen the intrados and extrados of the section of the blade, make it possible to ensure sufficient material at the ends 12, 13 to guarantee a quantity of kneaded material which is close of that kneaded at a central portion of the junction section S, which makes it possible to achieve a material heating temperature which is substantially similar between the ends and the central portion of the section S.

In addition, the presence of the average radii R2, R3 on sectors N, M of at least 120° makes it possible to sufficiently preserve the rounded shape of the ends 12, 13 (unlike a more pointed shape of the edges 4.2 and 4.3 without the extra thicknesses e2, e3). This helps to homogenize the speed of material consumption during welding over the entire section S, because the rounded contours 12, 13 follow, in a substantially coaxial manner, the orbital oscillation movement.

With reference to FIG. 2, the method for sizing the stubs of the invention may further comprise a determination of a ratio between a maximum average length $z_{max}$ from projected rays $z_{i,\alpha}$ extending completely in the first section 11 from a point i at its periphery, and a minimum average length $z_{min}$ from rays $z_{i,\alpha}$ extending completely in said first section 11 from another point i at its periphery.

Indeed, the determination of the maximum average length $z_{max}$ and minimum $z_{min}$ requires the determination of the average length $z_i$ for each of the points i over the entire periphery of the first section 11. Such a determination is, preferably, a automated process using a computer algorithm. In this regard, an algorithm applying a method of the type: "ray tracing" can be adapted, the latter being also known by the English name "ray tracing".

The ray tracing method can be performed using the following steps:
- model a first section 11 based on the final aerodynamic profile 4.1 of the blade with the addition of the extra thickness e (which shares the same value as that of the eccentric which is planned to be applied to the tool during the orbital welding); And
- divide the periphery of section 11 into several points i from which the rays $z_{i,\alpha}$ will be projected, preferably at approximately 2000 points distributed homogeneously (this number may vary depending on the desired calculation precision); And
- project rays $z_{i,\alpha}$ which sweep (scan) the entire section 11 from a first point i of the periphery 11.1, the number of projected rays $z_{i,\alpha}$ depends preferentially on an angle α of between 0.001° and 10°; And
- measure the average length $z_i$ of all the rays $z_{i,\alpha}$ projected from the first point i; And
- repeat the step of projecting the rays $z_{i,\alpha}$ as well as that of measuring the average length $z_i$, successively for all points i of the periphery; And
- evaluate all the average lengths $z_i$ measured from all points i to determine the maximum average length $z_{max}$ and the minimum average length $z_{min}$.

In the configuration illustrated in FIG. 2, the minimum average length $z_{min}$ is measured from a point i located at one of the two ends 12 and 13, and the maximum average length $z_{max}$ is measured from another point i located at a central part of the first section 11.

Advantageously, the extra thicknesses e2 and e3 are added to the first section 11 modeled so as to optimize the shape at the ends 12, 13 to allow the junction section S to respect the ratio: $z_{max}/z_{min} \leq 2$.

Figure 5:
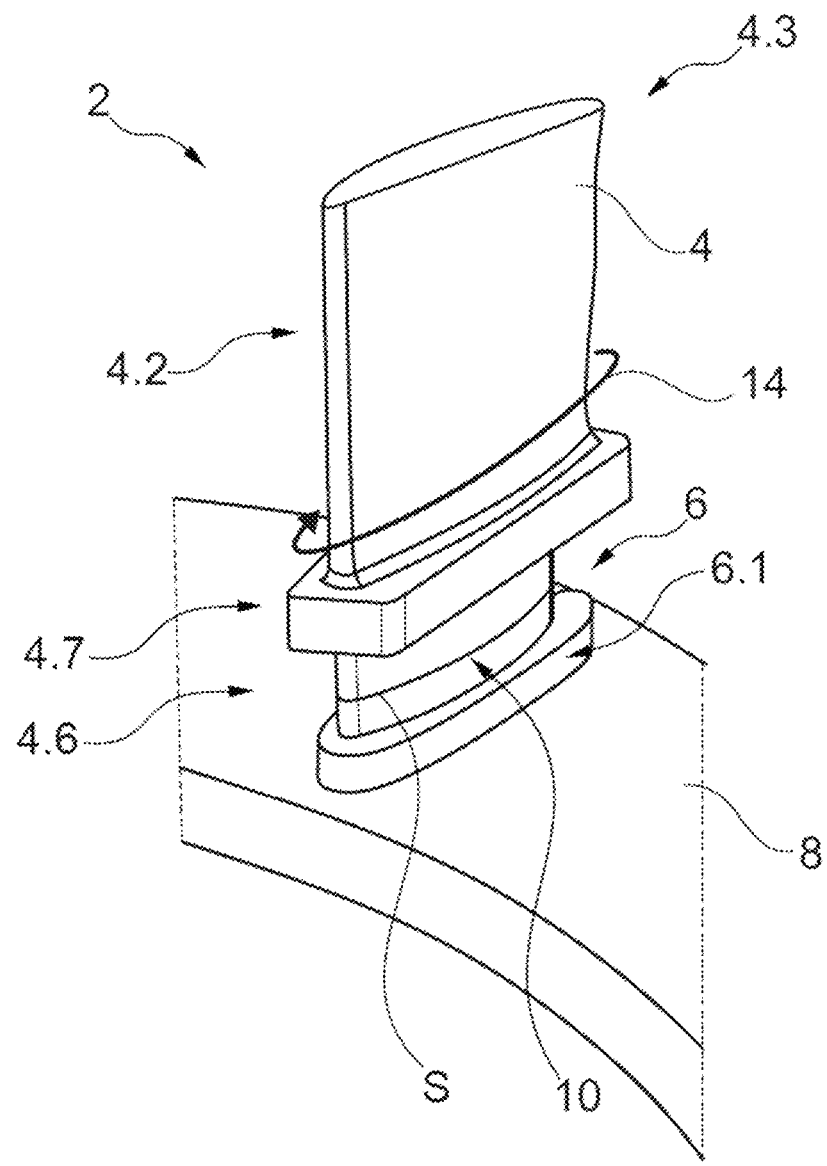
FIG. 5 schematically represents a perspective view, during orbital friction welding, of the blade to the stub of the disc, by means of the junction section.

FIG. 5 schematically represents a perspective view, during orbital friction welding, of the blade 4 to the stub 6 of the disk 2, by means of the junction section S.

Preferably, the blade 4 comprises to the right of its lower end 4.6 a reinforcement 4.7 which will be machined after the welding operation by an orbital oscillation movement 14, together with a volume 6.1 for reinforcing the stub 6 on the disc 2.

Advantageously, the dimensioning of the junction section S with the optimization of the rounded contours at the ends, in particular following a determination of a corresponding average radius, allows an optimal widening in relation to the final section, which effectively increases the contact surface during orbital friction welding at said ends so as to avoid the recirculation of the material at the level of the aerodynamic profile section of the blade 4 and thus allow homogeneity of the mixing of the material of the stub 6 with that of blade 4, to obtain a final weld having better structural quality and free of recesses and contaminants.

In addition, during welding, to the right of the junction section S, a material consumption rate remains constant, which makes it possible to obtain a resistant junction 10 and better quality of the weld.

Preferably, the junction section S of each of the blades 4 and stub 6 comprises a total surface area greater than or equal to 200 mm² and less than or equal to 7000 mm², and more preferably between 2000 mm² and 3000 mm².

Figure 6A:
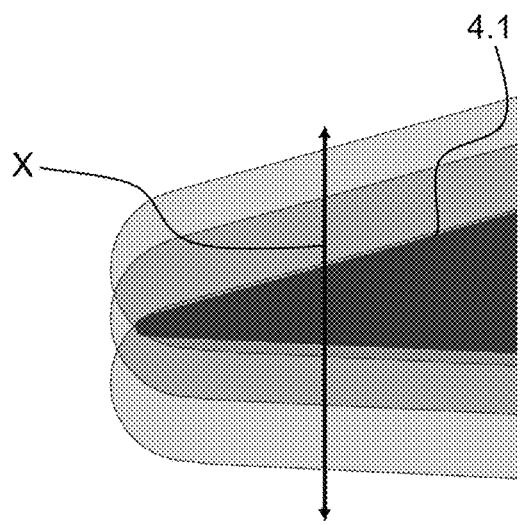
FIG. 6A represents relative movements of two sections of the prior art during linear friction welding following a direction of oscillation perpendicular to the chord of the profile.
Figure 6B:
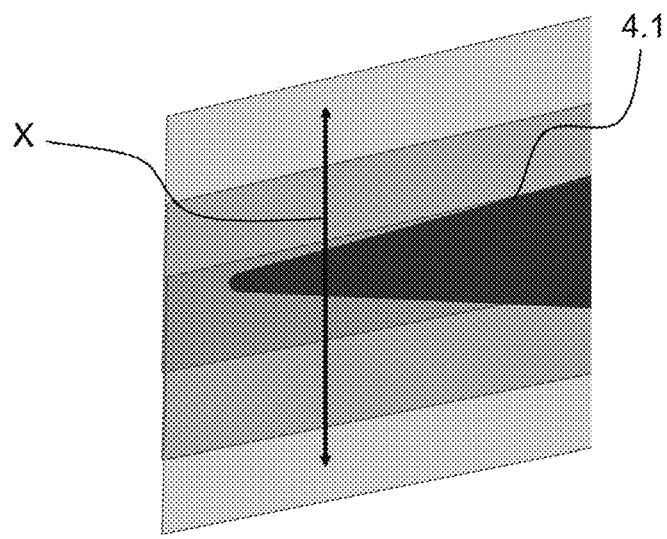
FIG. 6B represents relative movements of two sections of the prior art with excess material forming a right angle parallel to the direction of oscillation during linear friction welding.
Figure 6C:
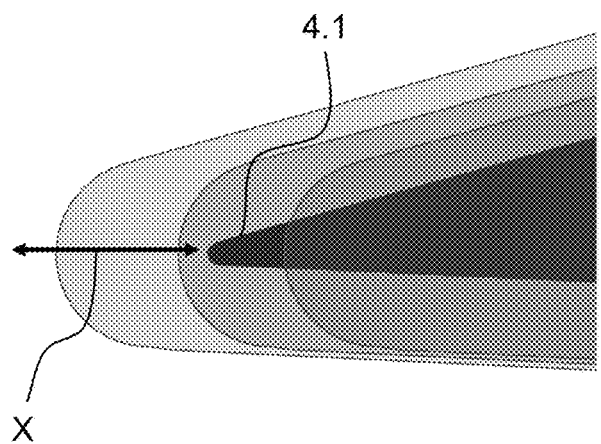
FIG. 6C represents relative movements of two sections of the prior art during linear friction welding following a direction of oscillation parallel to the chord of the profile.

FIGS. 6A, 6B and 6C represent the relative movements of the sections to be welded corresponding to the state of the prior art (linear welding) in a direction by rope).

The section of the prior art corresponds here to a section as proposed by the published patent document EP 1 495 829 A1, i.e. in which each end of the front and rear edge zone comprises an excess of material which ends with a straight edge aligned parallel to an oscillation direction.

Figure 7:
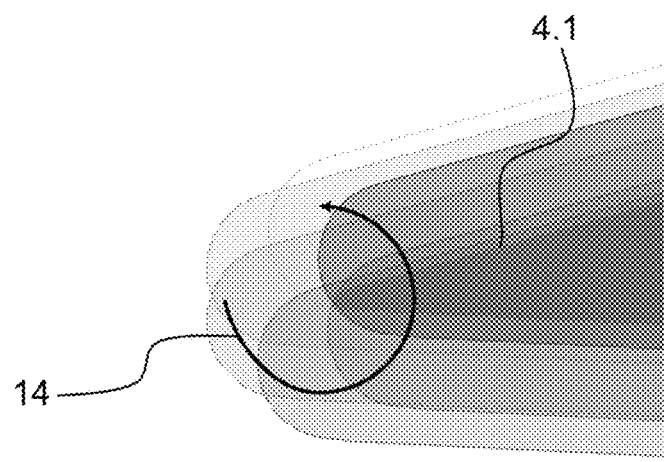
FIG. 7 represents relative movements of two sections according to the invention during orbital friction welding.

FIG. 7 represents relative movements of two sections according to the invention during orbital friction welding. This figure schematizes the fundamental difference with the prior art (linear friction) and allows a better understanding of the relative movements of the two sections to be welded in the context of an orbital weld.

Figure 8:
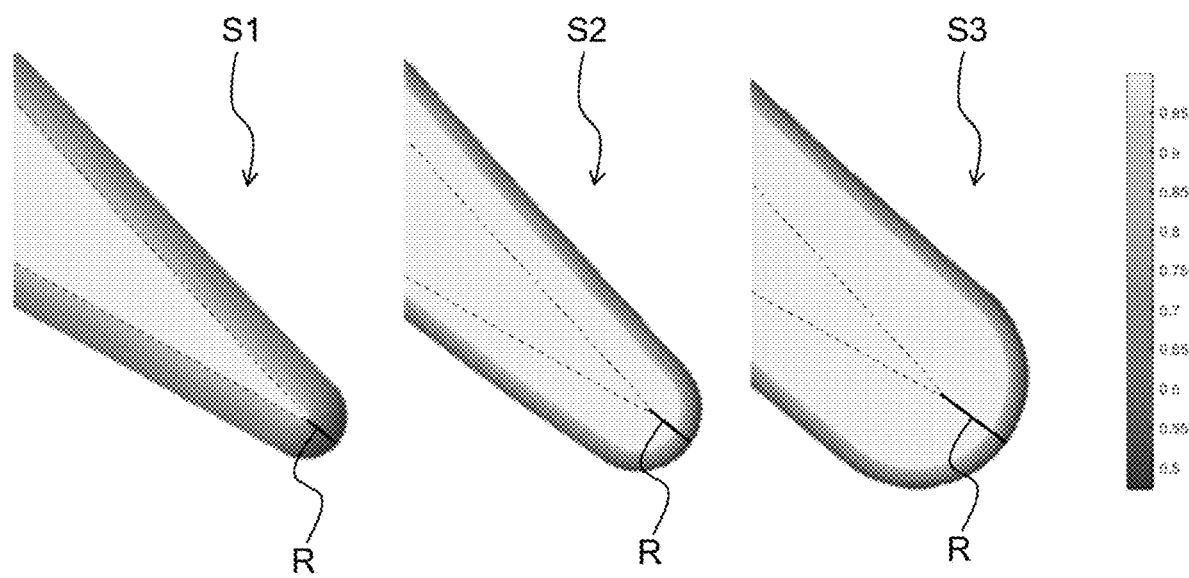
FIG. 8 represents a percentage of contact time between corresponding sections during orbital welding, for three different section modelings.

FIG. 8 represents a percentage of contact time between corresponding sections during orbital welding, for three modelings of different sections S1, S2 and S3.

The first section S1 comprises at at least one of its ends an average radius R less than twice the eccentric e (R=1.1.e) which is not in accordance with the invention. The two other sections S2 and S3 are, however, modeled according to the present invention and display an average radius to eccentric ratio greater than 2.

FIG. 8 also represents the proportion of time during which two corresponding weld sections come into contact during the orbital welding process, and this during a period of orbital movement for the same value of the eccentric.

TABLE 1

|  | S1 | S2 | S3 |
| --- | --- | --- | --- |
| R/e | 1.1 | 3.3 | 6 |
| Contact time | 35% | 45% | 47% |
| Weld condition | NOK | OK | OK |

With reference to FIG. 8 and Table 1, we can see that for the same value of the eccentric, the average time in contact increases with the value of the ratio R/e (average radius on the eccentric). A higher contact time will lead to better thermal homogeneity and therefore a reduction in the thermal gradients present at the ends of the stub profile.

It can also be seen that the surfaces of two sections which remain in contact the most during orbital welding are mainly concentrated around the aerodynamic profile of the final blade (shown in dotted lines), thus making it possible to ensure that the mixing of material covers 100% of the final section of the blade, the excess material being intended to be machined.

A weld condition rated as "OK" indicates a healthy weld, free of structural defects or contaminants. A "NOK" weld corresponds to a weld presenting a lack of material (cracking in the welded joint) or breakage of the flash. Thermal inhomogeneity can also disrupt the ejection of contaminants generated at the very first moments of welding. A "NOK" weld can therefore also correspond to a weld presenting contaminants which have not been ejected out of the final profile of the blade.

It can be seen from table 1 that the sections S2, S3 having an average radius R greater than or equal to 2.e make it possible to obtain a welded junction whose health status is "OK", while the section S1 comprising an average radius R less than 2.e, leads to a state of the welded junction qualified as non-compliant "NOK".

This notion of R/e ratio is not present in the prior art because it is not applicable to a linear weld. This can in particular be explained by the fact that the excess material as well as the straight edge proposed by document EP 1 495 829 A1, were modeled following a linear friction direction only direction of linear friction, but rather encompasses all directions, because the mixing of material is done 360° in orbital welding. Therefore, the straight edge creates areas of high stress (lateral edges) during orbital friction. These sharp edges will cause the flash to break in two directions, which will disrupt the ejection of contaminants.

In general, it is important to note that a configuration where two sections to be welded have a perfect circle shape allows for optimal orbital welding. This configuration ensures perfectly homogeneous and constant mixing, which guarantees a stable temperature rise of the materials. In addition, the circular shape of the sections allows uniformity of friction over 360°, without changing shape. Based on this principle, the inventors took the inventive step of increasing the radius of the rounded contours at the ends of the junction section, while optimizing the surplus material added to the aerodynamic profile of the blade. Thus, they realized that when the average radius is equal to at least 2.e and over an angular sector of at least 120°, then the risk of the appearance of stress zones at the level of the shape of the section which could cause Recirculation of material in the weld or cracking at the interface of the two materials to be welded is considerably reduced.

Advantageously, an average radius of between 2.e and 6.e makes it possible to obtain a general shape of the junction section which guarantees an "OK" weld state. Beyond 6.e, the gain becomes not considerable in terms of the material health of the welded junction, and adds machining time to the stub after welding.

The welds were carried out on the same machine and with constant welding parameters, i.e. eccentricity, oscillation frequency, speed and forging pressure which remain unchanged, only the shape of the sections is modified.

The absence of contaminants is observed when the sections are dimensioned according to the method of the invention with an average radius at the ends which is equal to at least twice the eccentric e and at most six times the eccentric e. While the presence of contaminants is noted when the average radius is less than 2.e.

The invention claimed is:

1. A method for sizing a section of a junction by orbital friction welding with an eccentric e, between a blade and a stub of a bladed disk for a turbomachine, wherein the sized section has a rounded contour at one or two ends of said section being disposed along a chord of the blade, each corresponding to a leading edge or a trailing edge of said blade, said rounded contour having over a sector of at least 120° an average radius of at least twice the eccentric e and at most six times the eccentric e.

2. The method according to claim 1, wherein at least one of the rounded contours is at a distance from the corresponding leading edge or trailing edge so as to form an upstream extra thickness or downstream extra thickness, respectively, with respect to a final section of the blade, said at least one of the upstream or downstream extra thicknesses being removed after joining by welding.

3. The method according to claim 2, wherein at least one of the upstream and downstream extra thickness has a value along the chord of the blade greater than 1 mm and/or less than 15 mm.

4. The method according to claim 1, wherein the sized section forms an extra thickness intrados and/or extrados relative to a final section of the blade, at least one of the said extra thickness intrados and extrados being removed after joining by welding.

5. The method according to claim 4, wherein at least one of the extra thickness intrados and extrados has a value along a perpendicular to the chord of the blade greater than 0.5 mm.

6. The method according to claim 4, wherein at least one of the extra thickness intrados and extrados has a value along a perpendicular to the chord of the blade less than 5 mm.

7. A method for manufacturing a bladed turbomachine disk comprising the steps:
provision of a disk with stubs; and
joining of blade to the stubs by orbital friction welding, wherein the stubs of the disk are sized according to a method for sizing a section of a junction by orbital friction welding with an eccentric e, between a blade and a stub of a bladed disk for a turbomachine, wherein the sized section has a rounded contour at one or two ends of said section along a chord of the blade, each corresponding to a leading edge or a trailing edge of said blade, said rounded contour having over a sector of at least 120° an average radius of at least twice the eccentric e and at most six times the eccentric e.

8. The method according to claim 7, comprising the additional step of:
machining of the stubs and the blade joined to the stubs so as to remove the rounded contour and arrive at the final section of the blade.

9. A rotor disk for the manufacture of a bladed disk for a turbomachine, the rotor disk comprising an external surface provided with an annular row of stubs extending radially from said external surface, each of the stubs comprising a section to be welded by orbital friction with a blade, wherein said stubs are sized according to a method for sizing a section of a junction by orbital friction welding with an eccentric e, between a blade and a stub of the bladed disk for the turbomachine, wherein the sized section has a rounded contour at one or two ends of said section along a chord of the blade, each corresponding to a leading edge or a trailing edge of said blade, said rounded contour having over a sector of at least 120° an average radius of at least twice the eccentric e and at most six times the eccentric e.

10. The rotor disk according to claim 9, wherein the section is between 200 mm$^2$ and 7000 mm$^2$.

11. The rotor disk according to claim 9, wherein the section is between 2000 mm$^2$ and 3000 mm$^2$.

* * * * *